(12) United States Patent
Sridharan et al.

(10) Patent No.: US 12,200,671 B2
(45) Date of Patent: Jan. 14, 2025

(54) CONFIGURING SUPER SLOTS FOR UPLINK AND DOWNLINK

(71) Applicant: QUALCOMM Incorporated, San Diego, CA (US)

(72) Inventors: Gokul Sridharan, Sunnyvale, CA (US); Seyedkianoush Hosseini, San Diego, CA (US); Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 17/449,505

(22) Filed: Sep. 30, 2021

(65) Prior Publication Data

US 2022/0110114 A1    Apr. 7, 2022

Related U.S. Application Data

(60) Provisional application No. 63/198,220, filed on Oct. 2, 2020.

(51) Int. Cl.
*H04W 72/50* (2023.01)
*H04W 72/0446* (2023.01)
(Continued)

(52) U.S. Cl.
CPC ....... *H04W 72/0446* (2013.01); *H04W 72/12* (2013.01); *H04W 72/231* (2023.01);
(Continued)

(58) Field of Classification Search
CPC ............ H04W 72/0446; H04W 72/12; H04W 72/50; H04W 72/0231; H04W 72/0232; H04L 1/1809; H04L 1/1822
See application file for complete search history.

(56) References Cited

U.S. PATENT DOCUMENTS

2002/0057709 A1 * 5/2002 Edmon ............... H04L 12/2801
348/E7.071
2005/0122231 A1 * 6/2005 Varaiya ................. H04W 40/22
340/870.01

(Continued)

OTHER PUBLICATIONS

International Search Report and Written Opinion—PCT/US2021/071683—ISA/EPO—Feb. 3, 2022.

(Continued)

*Primary Examiner* — Salvador E Rivas
(74) *Attorney, Agent, or Firm* — Harrity & Harrity, LLP

(57) ABSTRACT

Various aspects of the present disclosure generally relate to wireless communication. In some aspects, a mobile station may receive, from a base station, an indication of a time domain resource allocation, wherein the indication is associated with a starting symbol and a length and includes symbols across at least two slots. Accordingly, the mobile station may communicate, with the base station, using the time domain resource allocation. In some aspects, a mobile station may receive, from a base station, an indication of at least two slots to be merged, wherein the at least two slots are associated with a periodicity. Accordingly, the mobile station may communicate, with the base station and within the at least two slots. Numerous other aspects are provided.

30 Claims, 13 Drawing Sheets

700

U super slot 703

(51) Int. Cl.
*H04W 72/12* (2023.01)
*H04W 72/231* (2023.01)
*H04W 72/232* (2023.01)
*H04L 1/1809* (2023.01)
*H04L 1/1822* (2023.01)

(52) U.S. Cl.
CPC ......... *H04W 72/232* (2023.01); *H04W 72/50* (2023.01); *H04L 1/1809* (2013.01); *H04L 1/1822* (2013.01)

(56) References Cited

U.S. PATENT DOCUMENTS

| | | | | |
|---|---|---|---|---|
| 2018/0324678 | A1* | 11/2018 | Chen | H04W 8/08 |
| 2019/0132824 | A1* | 5/2019 | Jeon | H04L 5/0092 |
| 2019/0149365 | A1* | 5/2019 | Chatterjee | H04L 5/0094 |
| | | | | 370/329 |
| 2019/0268971 | A1* | 8/2019 | Talarico | H04W 76/27 |
| 2020/0162208 | A1* | 5/2020 | Moon | H04W 72/0446 |
| 2020/0170043 | A1* | 5/2020 | Fu | H04W 74/0833 |
| 2021/0226760 | A1* | 7/2021 | Ye | H04L 5/0073 |
| 2022/0353711 | A1* | 11/2022 | Ying | H04W 72/1263 |
| 2023/0189221 | A1* | 6/2023 | Lei | H04L 5/0092 |
| | | | | 370/281 |

OTHER PUBLICATIONS

ZTE: "Remaining Issues on Bandwidth Part", 3GPP TSG RAN WG1 Meeting #94, 3GPP Draft, R1-1808208 Remaining Issues on Bandwidth Part, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, 5 Pages, Aug. 11, 2018 (Aug. 11, 2018), XP051515593, Retrieved from the Internet: URL: http://www.3gpp.org/ftp/tsg%5Fran/WG1%5FRL1/TSGR1%5F94/Docs/R1%2D1808208%2Ezip [retrieved on Aug. 11, 2018-] figures 2.1-1, 2.1-2, section: 2.1, p. 1-p. 3.

* cited by examiner

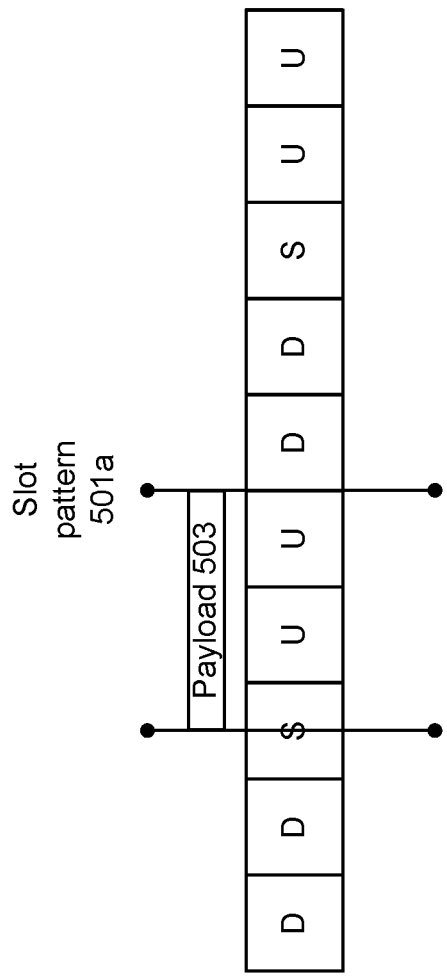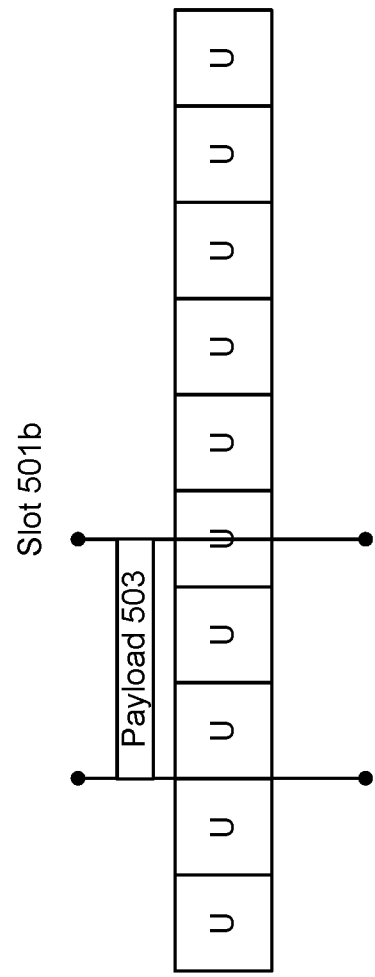

CONFIGURING SUPER SLOTS FOR UPLINK AND DOWNLINK

CROSS-REFERENCE TO RELATED APPLICATION

This Patent Applications claims priority to U.S. Provisional Patent Application No. 63/198,220, filed on Oct. 2, 2020, entitled "CONFIGURING SUPER SLOTS FOR UPLINK AND DOWNLINK," and assigned to the assignee hereof. The disclosure of the prior Applications is considered part of and is incorporated by reference in this Patent Applications.

FIELD OF THE DISCLOSURE

Aspects of the present disclosure generally relate to wireless communication and to techniques and apparatuses for configuring super slots for uplink and downlink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication. The method may include receiving, at a mobile station and from a base station, an indication of a time domain resource allocation, wherein the indication is associated with a starting symbol and a length and comprises symbols across at least two slots. The method may include communicating, with the base station, based at least in part on the time domain resource allocation.

Some aspects described herein relate to a method of wireless communication. The method may include transmitting, at a base station and to a mobile station, an indication of a time domain resource allocation, wherein the indication is associated with a starting symbol and a length and comprises symbols across at least two slots. The method may include communicating, with the mobile station, based at least in part on the time domain resource allocation.

Some aspects described herein relate to a method of wireless communication. The method may include receiving, at a mobile station and from a base station, an indication of at least two slots to be merged, wherein the at least two slots are associated with a periodicity. The method may include communicating, with the base station and within the at least two slots.

Some aspects described herein relate to a method of wireless communication. The method may include transmitting, at a base station and to a mobile station, an indication of at least two slots to be merged, wherein the at least two slots are associated with a periodicity. The method may include communicating, with the mobile station and within the at least two slots.

Some aspects described herein relate to a mobile station for wireless communication. The mobile station may include a memory and one or more processors coupled to the memory. The one or more processors may be configured to receive, from a base station, an indication of a time domain resource allocation, wherein the indication is associated with a starting symbol and a length and comprises symbols across at least two slots. The one or more processors may be configured to communicate, with the base station, based at least in part on the time domain resource allocation.

Some aspects described herein relate to a base station for wireless communication. The base station may include a memory and one or more processors coupled to the memory. The one or more processors may be configured to transmit, to a mobile station, an indication of a time domain resource allocation, wherein the indication is associated with a starting symbol and a length and comprises symbols across at least two slots. The one or more processors may be configured to communicate, with the mobile station, based at least in part on the time domain resource allocation.

Some aspects described herein relate to a mobile station for wireless communication. The mobile station may include a memory and one or more processors coupled to the memory. The one or more processors may be configured to receive, from a base station, an indication of at least two slots to be merged, wherein the at least two slots are associated with a periodicity. The one or more processors may be configured to communicate, with the base station and within the at least two slots.

Some aspects described herein relate to a base station for wireless communication. The base station may include a memory and one or more processors coupled to the memory.

The one or more processors may be configured to transmit, to a mobile station, an indication of at least two slots to be merged, wherein the at least two slots are associated with a periodicity. The one or more processors may be configured to communicate, with the mobile station and within the at least two slots.

Some aspects described herein relate to a non-transitory computer-readable medium that stores a set of instructions for wireless communication by a mobile station. The set of instructions, when executed by one or more processors of the mobile station, may cause the mobile station to receive, from a base station, an indication of a time domain resource allocation, wherein the indication is associated with a starting symbol and a length and comprises symbols across at least two slots. The set of instructions, when executed by one or more processors of the mobile station, may cause the mobile station to communicate, with the base station, based at least in part on the time domain resource allocation.

Some aspects described herein relate to a non-transitory computer-readable medium that stores a set of instructions for wireless communication by a base station. The set of instructions, when executed by one or more processors of the base station, may cause the base station to transmit, to a mobile station, an indication of a time domain resource allocation, wherein the indication is associated with a starting symbol and a length and comprises symbols across at least two slots. The set of instructions, when executed by one or more processors of the base station, may cause the base station to communicate, with the mobile station, based at least in part on the time domain resource allocation.

Some aspects described herein relate to a non-transitory computer-readable medium that stores a set of instructions for wireless communication by a mobile station. The set of instructions, when executed by one or more processors of the mobile station, may cause the mobile station to receive, from a base station, an indication of at least two slots to be merged, wherein the at least two slots are associated with a periodicity. The set of instructions, when executed by one or more processors of the mobile station, may cause the mobile station to communicate, with the base station and within the at least two slots.

Some aspects described herein relate to a non-transitory computer-readable medium that stores a set of instructions for wireless communication by a base station. The set of instructions, when executed by one or more processors of the base station, may cause the base station to transmit, to a mobile station, an indication of at least two slots to be merged, wherein the at least two slots are associated with a periodicity. The set of instructions, when executed by one or more processors of the base station, may cause the base station to communicate, with the mobile station and within the at least two slots.

Some aspects described herein relate to an apparatus for wireless communication. The apparatus may include means for receiving, from a base station, an indication of a time domain resource allocation, wherein the indication is associated with a starting symbol and a length and comprises symbols across at least two slots. The apparatus may include means for communicating, with the base station, based at least in part on the time domain resource allocation.

Some aspects described herein relate to an apparatus for wireless communication. The apparatus may include means for transmitting, to a mobile station, an indication of a time domain resource allocation, wherein the indication is associated with a starting symbol and a length and comprises symbols across at least two slots. The apparatus may include means for communicating, with the mobile station, based at least in part on the time domain resource allocation.

Some aspects described herein relate to an apparatus for wireless communication. The apparatus may include means for receiving, from a base station, an indication of at least two slots to be merged, wherein the at least two slots are associated with a periodicity. The apparatus may include means for communicating, with the base station and within the at least two slots.

Some aspects described herein relate to an apparatus for wireless communication. The apparatus may include means for transmitting, to a mobile station, an indication of at least two slots to be merged, wherein the at least two slots are associated with a periodicity. The apparatus may include means for communicating, with the mobile station and within the at least two slots.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A and 5B are diagrams illustrating examples associated with dynamically configuring a super slot, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
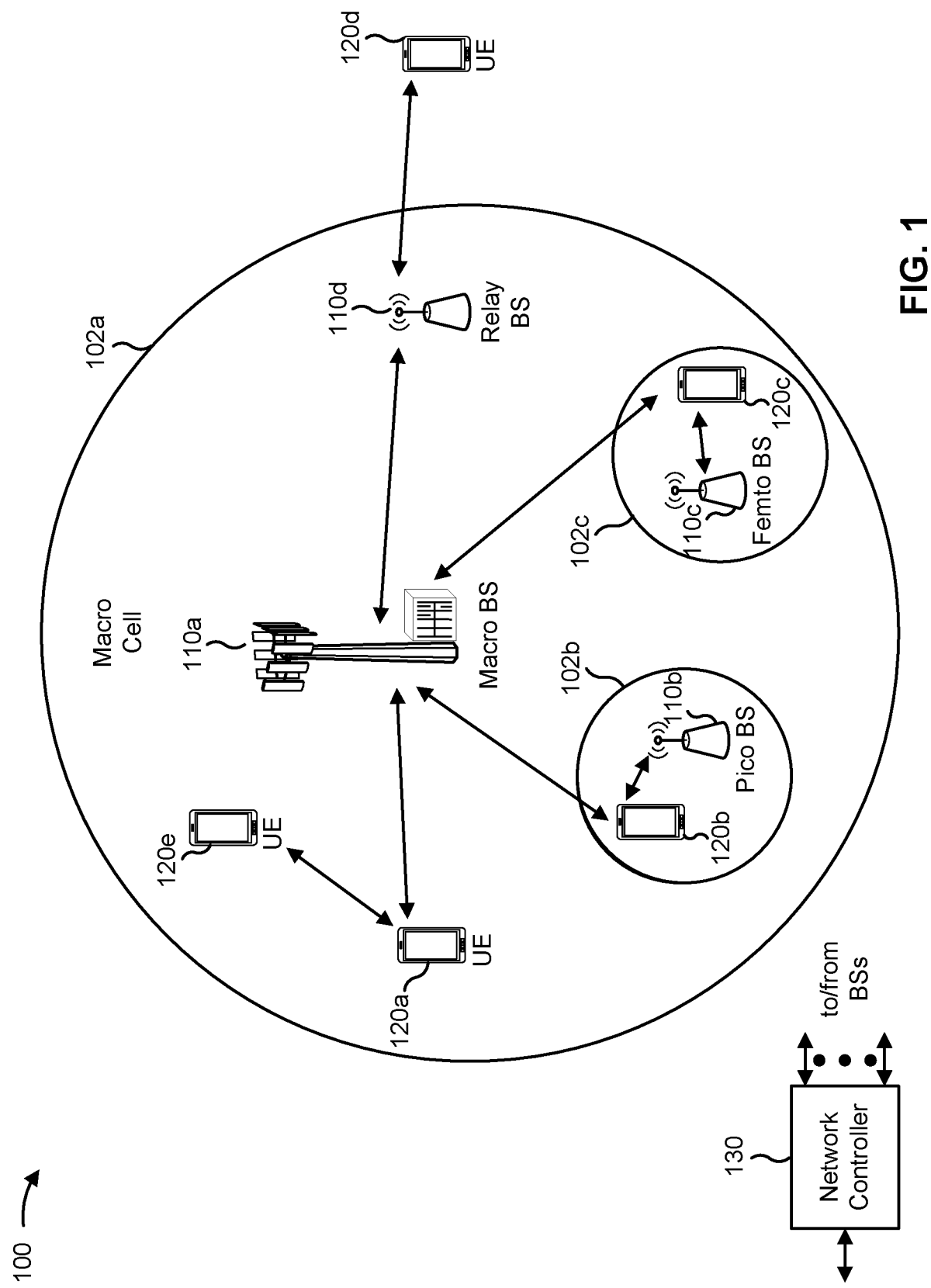
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
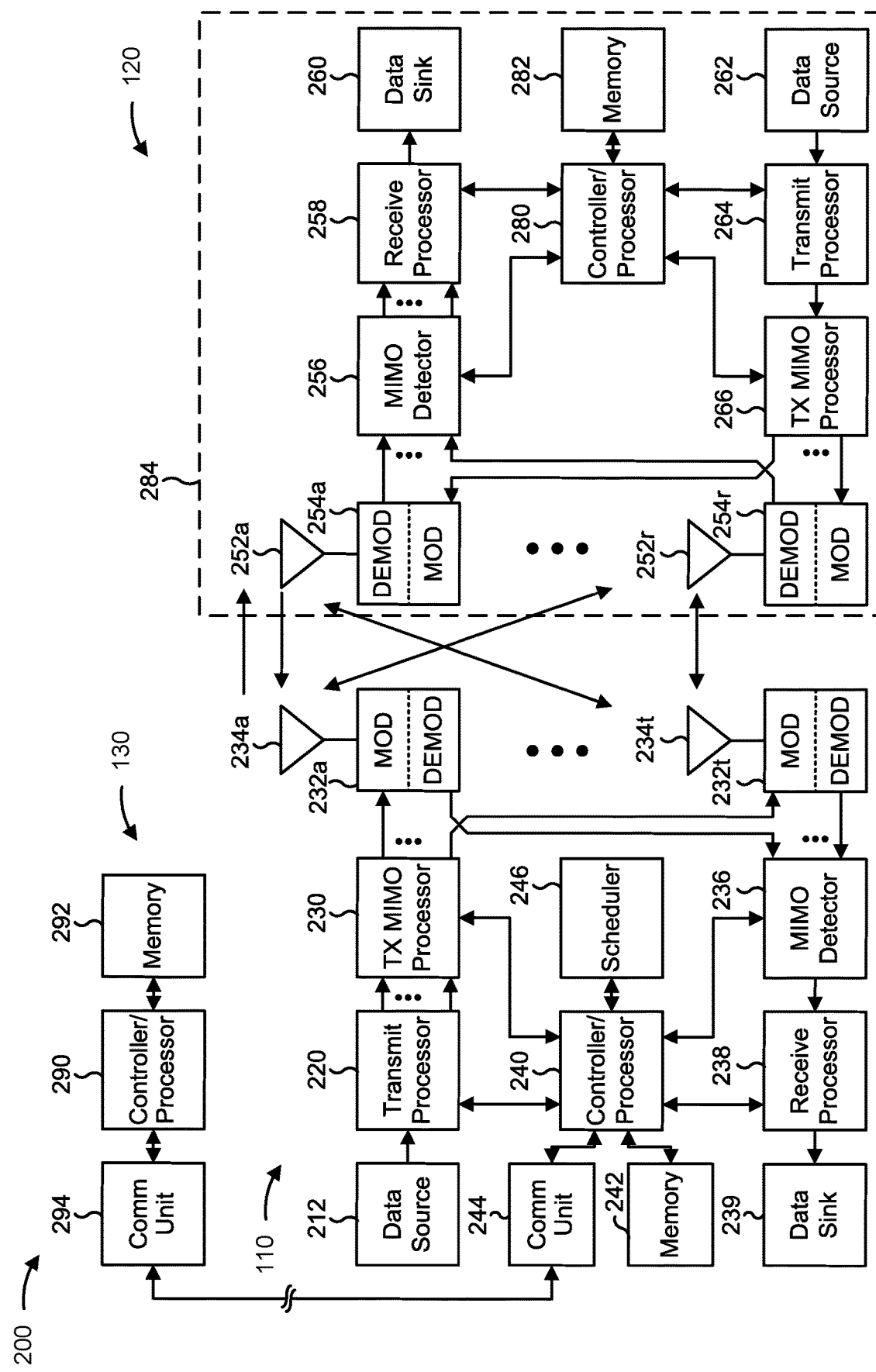
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the base station 110, the controller/processor 280 of the UE 120, and/or any other component(s) of FIG. 2 may perform one or more techniques associated with configuring super slots for uplink and downlink, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a mobile station (e.g., UE 120 and/or apparatus 1200 of FIG. 12) may include means for receiving, from a base station (e.g., base station 110 and/or apparatus 1300 of FIG. 13), an of a time domain resource allocation, wherein the indication is associated with a starting symbol and a length and comprises symbols across at least two slots; and/or means for communicating, with the base station, using the time domain resource allocation. In some aspects, the means for the mobile station to perform operations described herein may include, for example, one or more of antenna 252, modem 254, MIMO detector 256, receive processor 258, transmit processor 264, TX MIMO processor 266, controller/processor 280, or memory 282.

Additionally, or alternatively, the mobile station may include means for receiving, from the base station, an indication of at least two slots to be merged, wherein the at least two slots are associated with a periodicity; and/or means for communicating, with the base station and within the at least two slots. In some aspects, the means for the mobile station to perform operations described herein may include, for example, one or more of antenna 252, modem 254, MIMO detector 256, receive processor 258, transmit processor 264, TX MIMO processor 266, controller/processor 280, or memory 282.

In some aspects, a base station (e.g., base station 110 and/or apparatus 1300 of FIG. 13) may include means for transmitting, to a mobile station (e.g., UE 120 and/or apparatus 1200 of FIG. 12), an indication of a time domain resource allocation, wherein the indication is associated with a starting symbol and a length and comprises symbols across at least two slots; and/or means for communicating, with the mobile station, using the time domain resource allocation. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

Additionally, or alternatively, the base station may include means for transmitting, to the mobile station, an indication of at least two slots to be merged, wherein the at least two slots are associated with a periodicity; and/or means for communicating, with the mobile station and within the at least two slots. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
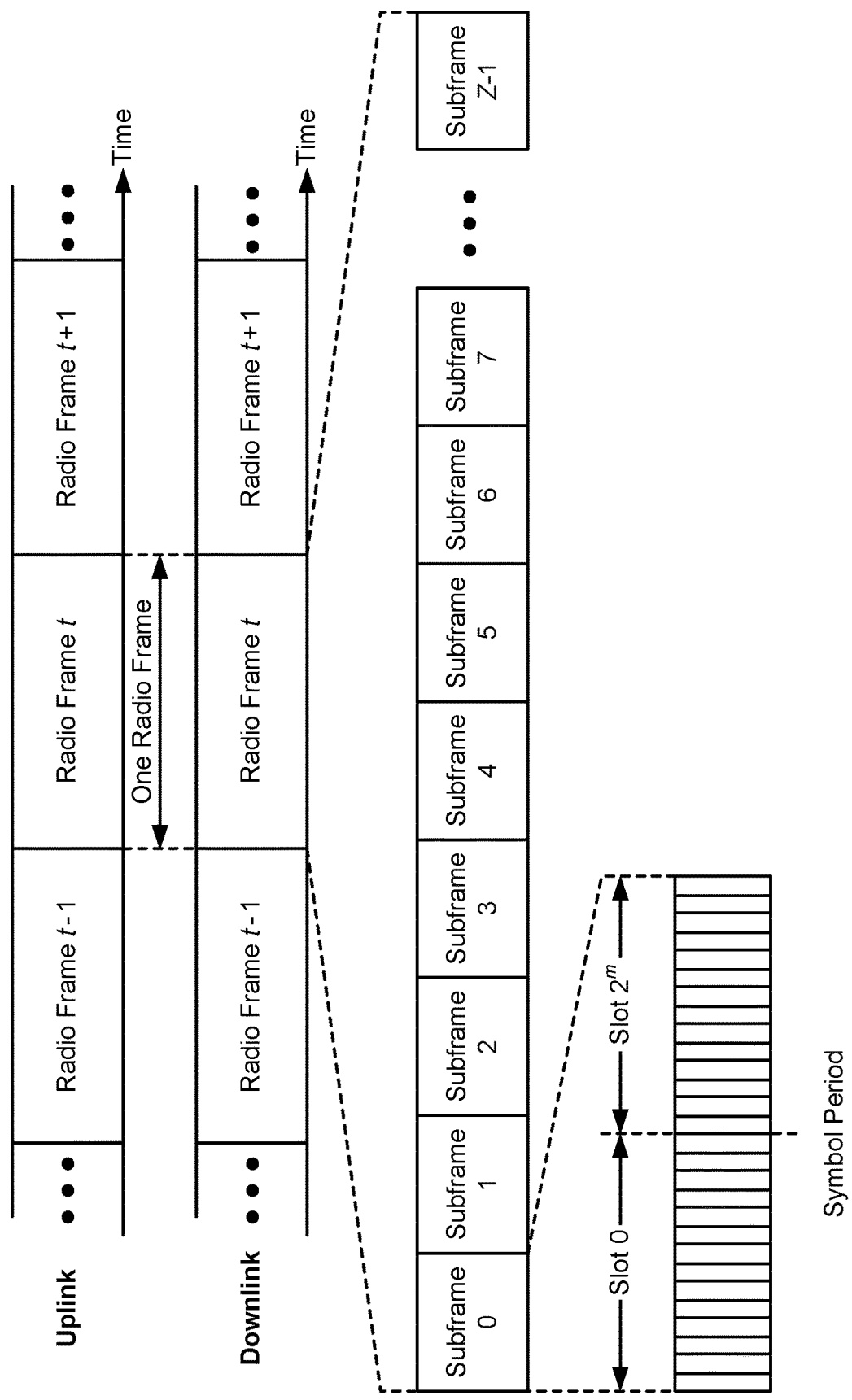
FIG. 3 is a diagram illustrating an example of frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 3, where m is an index of a numerology used for a transmission, such as 0, 1, 2, 3, 4, or another number). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based.

A base station is generally limited to transmitting, to a UE, data payloads within a single slot configured for downlink. Similarly, the UE is also limited to transmitting, to the base station, data payloads within a single slot configured for uplink. However, when the base station and the UE have a reliable wireless connection, limiting data payloads to a single slot causes latency when the base station has data to transmit but has to wait until a next downlink slot and/or when the UE has data to transmit but has to wait until a next uplink slot. This latency wastes power and memory overhead at the base station and/or the UE, respectively.

Additionally, when a repetition (e.g., a type B repetition, as defined in 3GPP specifications, and/or another repetition) extends across a boundary between slots, the UE and/or the base station usually must begin the repetition anew in the next slot. This wastes power and processing resources at the UE and/or the base station, respectively. Additionally, network resources are occupied even though the repetition must begin anew in the next slot anyway, which results in inefficient use of network spectrum and increased interference for other devices.

Some techniques and apparatuses described herein enable a base station (e.g., base station 110) to configure one or more super slots for a mobile station (e.g., UE 120). A super slot may combine symbols across a slot such that the super slot has a length longer than fourteen symbols. Accordingly, a data payload (e.g., transmitted from the base station 110 to the UE 120 on a downlink or transmitted from the UE 120 to the base station 110 on an uplink) may be larger than when the payload is limited to a single slot. By using larger payloads, the UE 120 experiences reduced latency when the UE 120 has data to transmit, and the base station 110 similarly experiences reduced latency when the base station 110 has data to transmit. This reduction in latency conserves power and memory overhead at the UE 120 or the base station 110, respectively.

In some aspects, the UE 120 and/or the base station 110 may further use a super slot to estimate a channel condition using DMRSs transmitted across slots (e.g., across slots that were combined, at least in part, to form the super slot). Accordingly, the UE 120 and/or the base station 110 may obtain a more accurate estimate of channel condition by using cross-slot DMRS measurements. Additionally, or alternatively, the UE 120 and/or the base station 110 may reduce a density of DMRSs in the super slot as compared with a single slot. Accordingly, the UE 120 and/or the base station 110 may conserve power and processing resources used to generate and transmit DMRSs.

In some aspects, the UE 120 and/or the base station 110 may further use a super slot to improve efficiency of repetitions at a slot boundary. For example, the UE 120 and/or the base station 110 may transmit a repetition across a slot boundary that is contained within the super slot. This conserves power and processing resources at the UE 120 and/or the base station 110, respectively. Additionally, network spectrum is more efficiently used and interference for other devices is decreased as compared with beginning the repetition anew in the next slot.

As indicated above, FIG. 3 is provided as an example. Other examples may differ from what is described with respect to FIG. 3.

Figure 4:
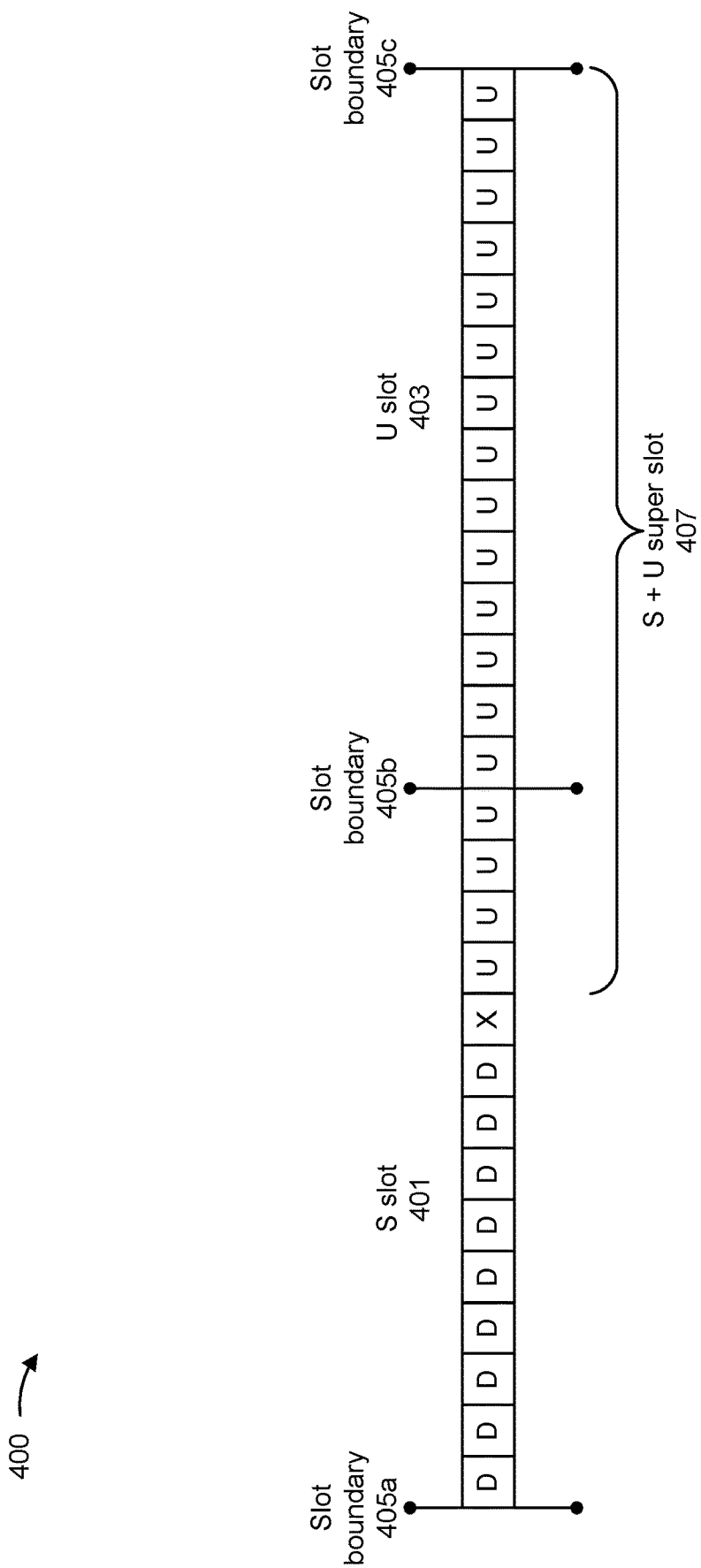
FIG. 4 is a diagram illustrating an example associated with configuring a super slot, in accordance with the present disclosure.

FIG. 4 is a diagram illustrating an example 400 associated with configuring super slots, in accordance with the present disclosure. As shown in FIG. 4, example 400 includes a super slot used by a mobile station (e.g., UE 120) to transmit a data payload to a base station (e.g., base station 110) on an uplink (e.g., an uplink on wireless network 100 of FIG. 1). Although FIG. 4 depicts a super slot for an uplink, the description similarly applies to a super slot for a downlink (e.g., a downlink on wireless network 100 of FIG. 1).

In example 400, a flexible slot 401 (shown as an "S" slot) may be allocated between the downlink and the uplink. The base station 110 may configure the super slot 407 by combining uplink symbols in the flexible slot 401 with an adjacent uplink slot 403 (shown as a "U" slot). Accordingly, the flexible slot 401 includes fourteen symbols between slot boundary 405a and 405b, and the uplink slot 403 includes fourteen symbols between slot boundary 405b and 405c, while the super slot 407 may include more than fourteen symbols and may span at least one slot boundary (e.g., slot boundary 405b in example 400).

By using the super slot of example 400, the UE 120 may transmit a data payload to the base station 110 using eighteen symbols rather than fourteen symbols. Other examples may include super slots of smaller size (e.g., seventeen symbols, sixteen symbols, and so on) and/or larger size (e.g., nineteen symbols, twenty symbols, and so on). Although the description focuses on a super slot formed by merging one full slot with a portion of another slot, the description similarly applies to merging portions of two slots, merging two full slots with a portion of a third slot, merging three full slots, merging three full slots with a portion of a fourth slot, and so on.

By using super slots as described in connection with FIG. 4, the UE 120 and/or the base station 110 may transmit larger payloads in order to reduce latency as well as conserve power and memory overhead at the UE 120 and/or the base station 110, respectively. In some aspects, the UE 120 and/or the base station 110 may further use a super slot to estimate a channel condition using DMRSs transmitted across slots (e.g., across the "S" slot 401 and the "U" 403 slot in example 400). Accordingly, the UE 120 and/or the base station 110 may obtain a more accurate estimate of channel condition by using cross-slot DMRS measurements. Additionally, or alternatively, the UE 120 and/or the base station 110 may reduce a density of DMRSs in the super slot 407 to further conserve power and processing resources. Additionally, or alternatively, the UE 120 and/or the base station 110 may transmit a repetition across the slot boundary 405b that is contained within the super slot 407 (e.g., the boundary between the "S" slot 401 and the "U" slot 403 in example 400) to further conserve power and processing resources as well as use network spectrum more efficiently and reduce interference for other devices.

As indicated above, FIG. 4 is provided as an example. Other examples may differ from what is described with respect to FIG. 4.

FIGS. 5A and 5B are diagrams illustrating examples 500 and 550 associated with dynamically configuring a super slot, in accordance with the present disclosure. As shown in FIGS. 5A and 5B, examples 500 and 550 include super slots used by a mobile station (e.g., UE 120) to transmit a data payload to a base station (e.g., base station 110) on an uplink (e.g., an uplink on wireless network 100 of FIG. 1). Although FIGS. 5A and 5B depict super slots for an uplink, the description similarly applies to a super slot for a downlink (e.g., a downlink on wireless network 100 of FIG. 1).

In example 500, the base station 110 configured the super slot by combining uplink symbols in a flexible slot (shown as an "S" slot) of a slot pattern 501a with two adjacent uplink slots (shown as "U" slots) of the slot pattern 501a. Accordingly, a larger payload 503 may be transmitted in the super slot as compared with a single slot.

In example 550, the base station 110 configured the super slot by combining two uplink slots (shown as "U" slots) of a slot pattern 501b together along with a portion of an adjacent uplink slot (also shown as a "U" slot) of the slot pattern 501b. Accordingly, a larger payload 503 may be transmitted in the super slot as compared with a single slot. Although the description focuses on super slots formed by merging two full slots with a portion of another slot, the description similarly applies to merging portions of two slots, merging two full slots, merging three full slots, merging three full slots with a portion of a fourth slot, and so on.

To configure a super slot, the base station 110 may transmit, and the UE 120 may receive, an indication of a time domain resource allocation. The indication may be associated with a starting symbol and a length and include symbols across at least two slots. In example 500, the indication may be associated with a starting symbol within the "S" slot and a length from that starting symbol to a last symbol of the second "U" slot. In example 550, the indication may be associated with a starting symbol that is a first symbol of the first "U" slot and a length between that starting symbol and a symbol within the third "U" slot. Accordingly, in examples 500 and 550, the indication includes symbols across at least two slots.

In some aspects, the indication may include a radio resource control (RRC) message. For example, the starting symbol and the length may be indicated within a PUSCH-Allocation data structure (e.g., defined in 3GPP specifications and/or another standard) and/or another similar data structure included in the RRC message. Additionally, or alternatively, the indication may include downlink control information (DCI). For example, the starting symbol and the length may be indicated within a time domain resource assignment field (e.g., defined in 3GPP specifications and/or another standard) and/or another similar field within the DCI. In some aspects, the DCI may include an index that maps to one time domain resource allocation from a list of time domain resource allocations (e.g., a PUSCHOTimeDomainResourceAllocationList as defined in 3GPP specifications and/or another similar list), where the time domain resource allocation indicates the starting symbol and the length In some aspects, the indication may include an index based at least in part on the starting symbol and the length. For example, the indication may include a start and length indicator value (SLIV), where the SLIV is a single value that indicates both the starting symbol and the length. The SLIV may be encoded such that the length exceeds fourteen. Accordingly, the indication will include symbols across at least two slots. Additionally, or alternatively, the indication may include the starting symbol and the length. For example, the indication may include a startSymbol value (e.g., defined in 3GPP specifications and/or another standard) and/or another similar value as well as a length value (e.g., defined in 3GPP specifications and/or another standard) and/or another similar value. The length value may exceed fourteen such that the indication will include symbols across at least two slots.

The base station 110 and the UE 120 may communicate using the time domain resource allocation. For example, as shown in examples 500 and 550, the communication may include the UE 120 transmitting the payload 503 to the base station 110 (e.g., on the uplink). In some aspects, the indication may be associated with dynamic scheduling for the uplink. For example, the super slot may be activated by DCI for the payload 503. As an alternative, the indication may be associated with a configured grant scheduling scheme for the uplink. For example, the super slot may be activated by RRC (e.g., for Type 1 configured grant scheduling) and/or DCI (e.g., for Type 2 configured grant scheduling) for periodic transmissions to the base station 110.

As an alternative, the communication may include the UE 120 receiving a payload from the base station 110 (e.g., on the downlink). In some aspects, the indication may be associated with dynamic scheduling for the downlink. For example, the super slot may be activated by DCI for one payload. As an alternative, the indication may be associated with a semi-persistent scheduling (SPS) configuration for the downlink. For example, the super slot may be activated by RRC and/or DCI for periodic transmissions from the base station 110.

By using super slots as described in connection with FIGS. 5A and 5B, the UE 120 and/or the base station 110 may transmit larger payloads in order to reduce latency and conserve power and processing resources at the UE 120 and/or the base station 110, respectively. In some aspects, the UE 120 and/or the base station 110 may further use a super slot to estimate a channel condition using DMRSs transmitted across slots (e.g., across the "S" slot and one or more of the "U" slots in example 500 or across one or more of the "U" slots in example 550). Accordingly, the UE 120 and/or the base station 110 may obtain a more accurate estimate of channel condition by using cross-slot DMRS measurements. Additionally, or alternatively, the UE 120 and/or the base station 110 may reduce a density of DMRSs in the super slot to further conserve power and processing resources. Additionally, or alternatively, the UE 120 and/or the base station 110 may transmit a repetition across a slot boundary that is contained within the super slot (e.g., the boundary between the "S" slot and the first "U" slot in example 500, the boundary between the two "U" slots in example 500, the boundary between the first "U" slot and the second "U" slot in example 550, or the boundary between the second "U" slot and the final "U" slot in example 550) to further conserve power and processing resources as well as use network spectrum more efficiently and reduce interference for other devices.

As indicated above, FIGS. 5A and 5B are provided as examples. Other examples may differ from what is described with respect to FIGS. 5A and 5B.

Figure 6:
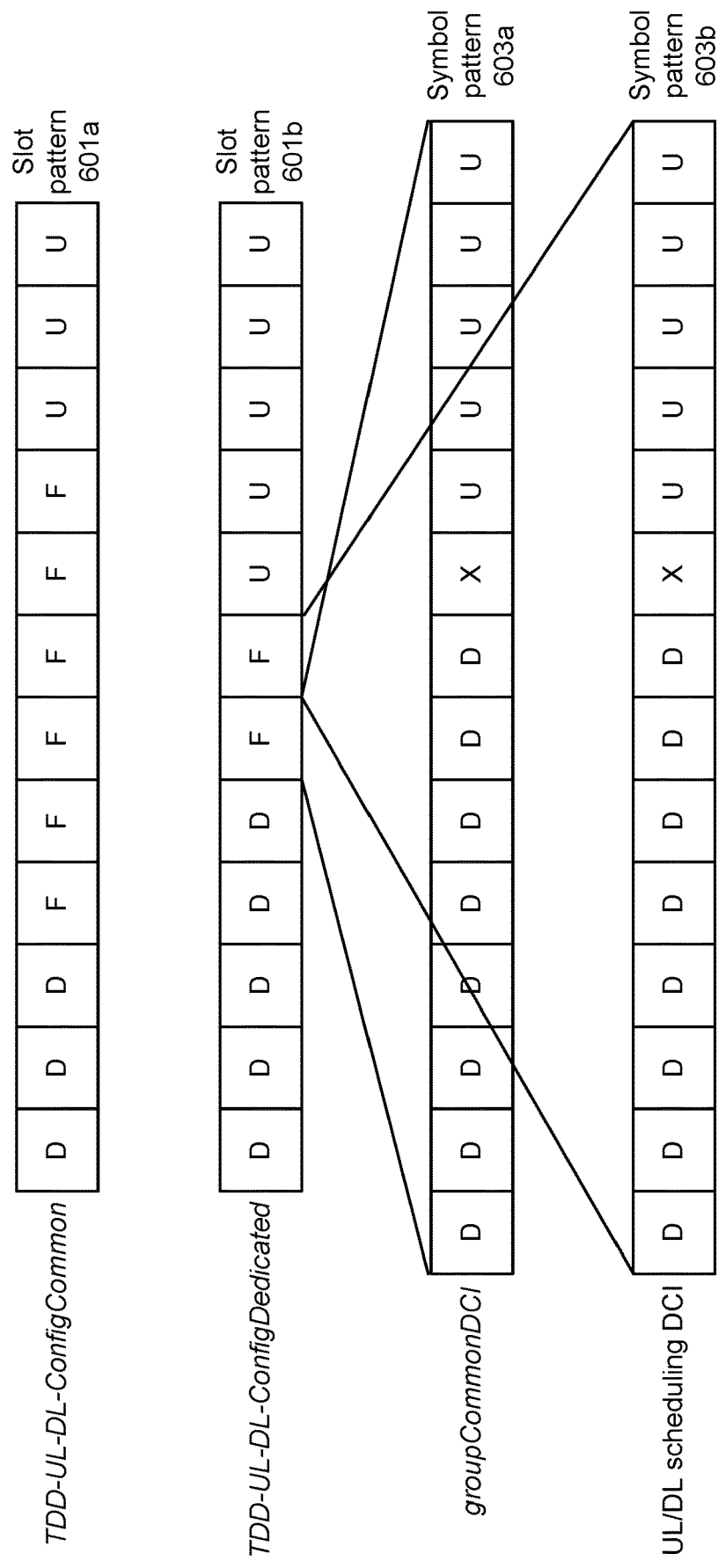
FIGS. 6 and 7 are diagrams illustrating examples associated with semi-statically configuring a super slot, in accordance with the present disclosure.
Figure 7:
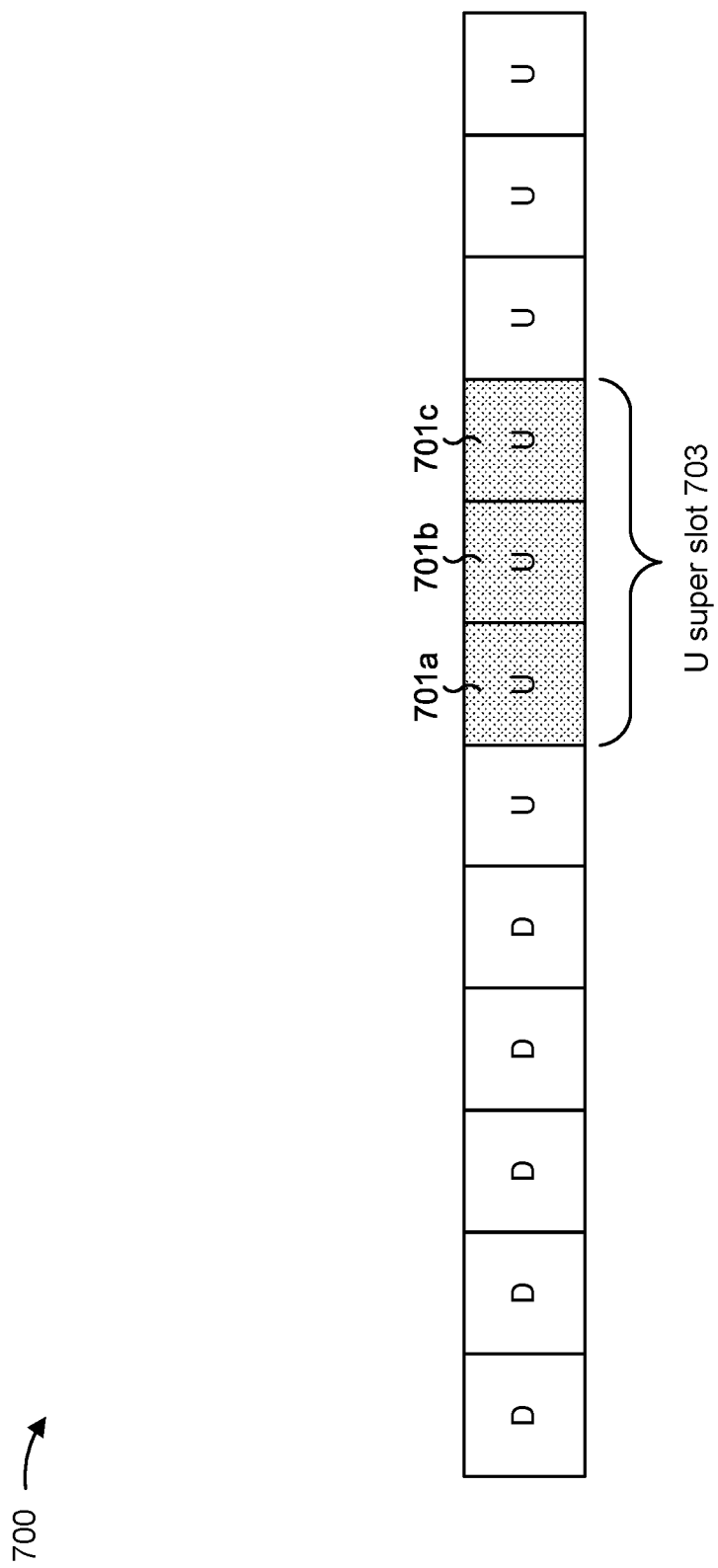

FIGS. 6 and 7 are diagrams illustrating examples 600 and 700 associated with semi-statically configuring a super slot, in accordance with the present disclosure. As shown in FIG. 6, a base station (e.g., base station 110) may configure slots, for a mobile station (e.g., UE 120) to use for uplink or downlink, using a combination of RRC messages and DCI. In example 600, the base station 110 may configure slots with a periodicity of twelve such that a pattern of slots repeats every twelve slots. For example, an initial slot pattern 601a (three downlink slots followed by six flexible slots followed by three uplink slots, in example 600) may be configured using a TDD-UL-DL-ConfigCommon data structure (e.g., as defined in 3GPP specifications and/or another standard) and/or other similar data structure in an RRC message. Additionally, in some aspects, the initial pattern 601a may be refined to slot pattern 601b (five downlink slots followed by two flexible slots followed by five uplink slots, in example 600) using a TDD-UL-DL-ConfigDedicated data structure (e.g., as defined in 3GPP specifications and/or another standard) and/or other similar data structure in another RRC message. In some aspects, remaining flexible slots may be divided between downlink and uplink symbols (optionally including one or more guard symbols shown as "X" symbols between downlink and uplink symbols) using DCI. For example, as shown in FIG. 6, the base station 110 may use groupCommonDCI (e.g., as defined in 3GPP specifications and/or another standard) to divide the first flexible slot according to symbol pattern 603a remaining and use scheduling DCI (e.g., for dynamic scheduling) to divide the second flexible slot according to symbol pattern 603b.

One or more of these RRC messages and/or DCI may be used to form super slots (e.g., as described in connection with FIG. 4). Additionally, or alternatively, one or more new RRC messages and/or new DCI may be used to form the super slots. As shown in FIG. 7, example 700 includes a super slot 703 used by the mobile station (e.g., the UE 120) to transmit a data payload to the base station (e.g., the base station 110) on an uplink (e.g., an uplink on wireless network 100 of FIG. 1). Although FIG. 7 depicts a super slot for an uplink, the description similarly applies to a super slot for a downlink (e.g., a downlink on wireless network 100 of FIG. 1).

In example 700, the base station 110 may configure the super slot 703 by combining three adjacent uplink slots 701a, 701b, and 701c (shown as "U" slots). Although the description focuses on super slots formed by merging three full slots, the description similarly applies to merging portions of two slots, merging two full slots, merging two full slots with a portion of a third slot, merging three full slots with a portion of a fourth slot, merging four full slots, and so on.

To configure the super slot 703, the base station 110 may transmit, and the UE 120 may receive, an indication of at least two slots to be merged. The at least two slots may be associated with a periodicity (e.g., as described in connection with FIG. 6). Accordingly, the super slot 703 including the at least two slots repeats in time based at least in part on the periodicity. In example 700, the seventh, eighth, and ninth slots within every twelve slots, repeated in time, form the super slot 703.

In some aspects, the at least two slots may include at least one flexible slot. For example, the base station 110 may convert the at least one flexible slot into an uplink slot for use in an uplink super slot or may convert the at least one flexible slot into a downlink slot for use in a downlink super slot. Additionally, or alternatively, the at least two slots may include at least one downlink slot or at least one uplink slot. For example, the base station 110 may combine uplink slots and/or flexible slots converted to uplink slots into an uplink super slot. In another example, the base station 110 may combine downlink slots and/or flexible slots converted to downlink slots into a downlink super slot.

In some aspects, the indication may be based at least in part on a starting symbol and a length. For example, as described in connection with FIGS. 5A-5B, the indication may include an SLIV and/or include the starting symbol and the length. Additionally, or alternatively, the indication may include a bitmap based at least in part on the periodicity. For example, the indication may include a set of bits, where each bit is associated with a corresponding one of the slots, and each bit indicates whether the corresponding slot is included in a super slot. Accordingly, in one example, a bitmap of '0 0 0 0 0 0 1 1 1 0 0 0' may indicate that the seventh, eighth, and ninth slots within every twelve slots, repeated in time, form the super slot 703, as shown in example 700. In another example, a bitmap of '0 1 1 0 0 0 1 1 1 1 0 0' may indicate that the second and third slots within every twelve slots, repeated in time, form one super slot and that the seventh, eighth, ninth, and tenth slots within every twelve slots, repeated in time, form another super slot.

In some aspects, the base station 110 may transmit, and the UE 120 may receive, an indication of a plurality of slots and the periodicity. The at least two slots may be included in the plurality of slots. In some aspects, and as described in connection with FIG. 6, the indication of the plurality of slots may include at least one RRC message. For example, the indication of the plurality of slots may include a TDD-UL-DL-ConfigCommon data structure and/or a TDD-UL-DL-ConfigDedicated data structure.

The base station 110 and the UE 120 may communicate, within the at least two slots. In some aspects, the base station 110 and the UE 120 may communicate using a transport block that is larger than a transport block associated with a single slot. For example, as shown in example 700, the communication may include the UE 120 transmitting a payload (e.g., associated with a transport block that is larger than a transport block associated with a single slot) to the base station 110 (e.g., on the uplink). As an alternative, the communication may include the UE 120 receiving a payload (e.g., associated with a transport block that is larger than a transport block associated with a single slot) from the base station 110 (e.g., on the downlink).

In some aspects, the UE 120 and the base station 110 may identify the at least two slots by an index associated with a first slot of the at least two slots. Accordingly, the base station 110 and the UE 120 may preserve existing slot structures for scheduling transmissions and use the index associated with the first slot to schedule within the super slot. Additionally, because the base station 110 configures the super slot with a periodicity (e.g., as described above), the UE 120 may schedule internal hardware events outside of the super slot. For example, the UE 120 may adjust one or more radio frequency (RF) parameters of one or more antennas, one or more modulators, one or more demodulators, or other hardware at a slot boundary not included within the super slot.

In some aspects, the base station 110 may transmit, and the UE 120 may receive, an indication of a change to the at least two slots. In some aspects, the indication of the change may include an RRC message. For example, the base station 110 may transmit a new TDD-UL-DL-ConfigDedicated data structure and/or a new RRC message to deactivate one or more current super slots and/or create one or more new super slots. Additionally, or alternatively, the indication of the change may include DCI. For example, the base station 110 may transmit a new slot format indicator (SFI) in DCI format 2_0 (e.g., as defined in 3GPP specifications and/or another standard) and/or new DCI to deactivate one or more current super slots and/or create one or more new super slots.

By using super slots as described in connection with FIGS. 6 and 7, the UE 120 and/or the base station 110 may transmit larger payloads in order to reduce latency and conserve power processing resources at the UE 120 and/or the base station 110, respectively. In some aspects, the UE 120 and/or the base station 110 may further use a super slot to estimate a channel condition using DMRSs transmitted across slots (e.g., across the "U" slots 701a, 701b, and 701c in example 700). Accordingly, the UE 120 and/or the base station 110 may obtain a more accurate estimate of channel condition by using cross-slot DMRS measurements. Additionally, or alternatively, the UE 120 and/or the base station 110 may reduce a density of DMRSs in the super slot to further conserve power and processing resources. Additionally, or alternatively, the UE 120 and/or the base station 110 may transmit a repetition across a slot boundary that is contained within the super slot (e.g., the boundary between the first "U" slot 701a and the second "U" slot 701b in example 700 or the boundary between the second "U" slot 701b and the third "U" slot 701c in example 700) to further conserve power and processing resources as well as use network spectrum more efficiently and reduce interference for other devices.

In some aspects, examples 600 and 700 may be combined with example 500 and/or example 550. For example, the base station 110 may semi-statically configure one or more super slots with a periodicity, as described above in connection with examples 600 and 700, and also dynamically configure one or more super slots for dynamic scheduling, configured grant scheduling schemes, and/or SPS configurations. Accordingly, the UE 120 may transmit a payload to the base station 110 (e.g., on the uplink) using a semi-static super slot or a dynamically configured super slot. Similarly, the base station 110 may transmit a payload to the UE 120 (e.g., on the downlink) using a semi-static super slot or a dynamically configured super slot.

As indicated above, FIGS. 6 and 7 are provided as examples. Other examples may differ from what is described with respect to FIGS. 6 and 7.

Figure 8:
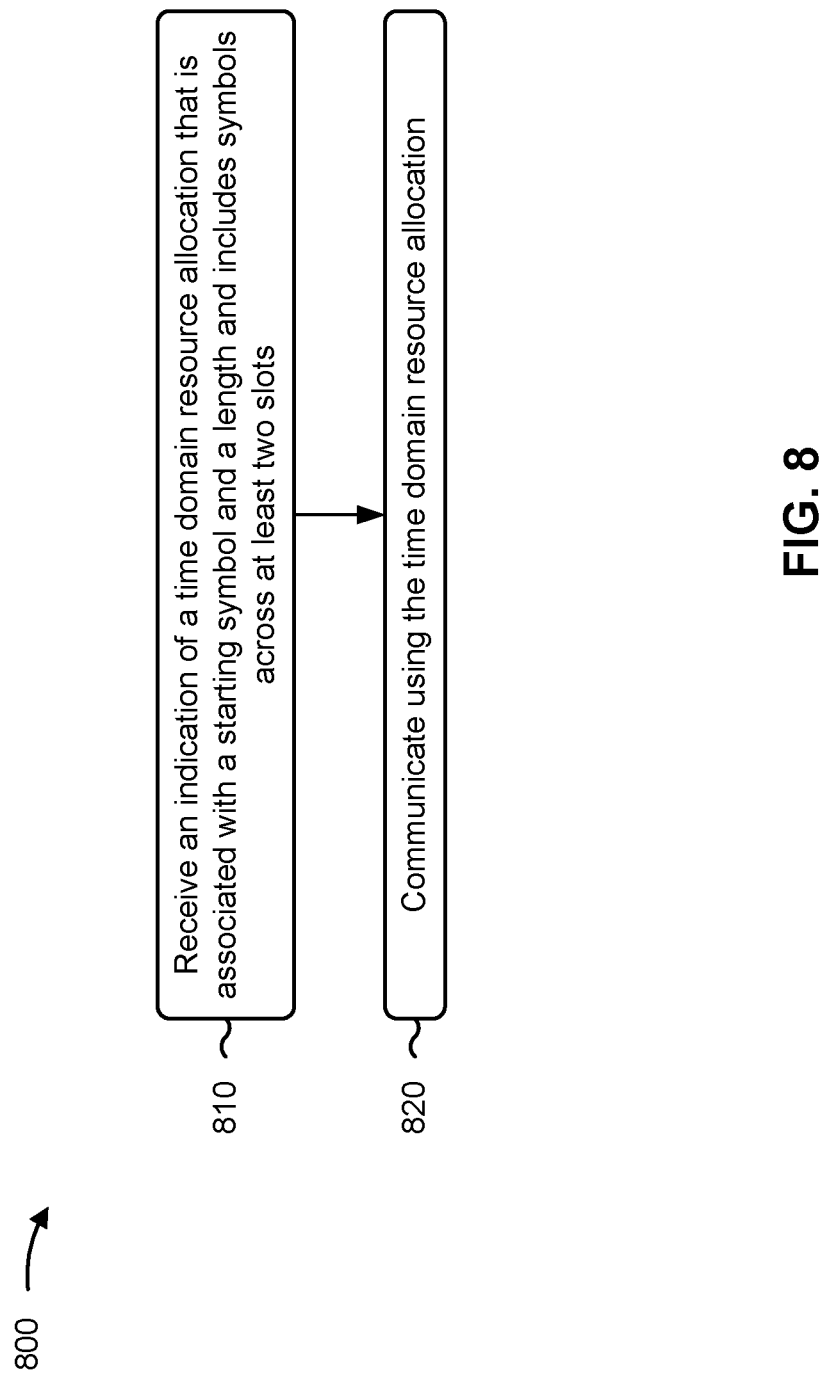
FIGS. 8, 9, 10, and 11 are diagrams illustrating example processes associated with configuring super slots for uplink and downlink, in accordance with the present disclosure.

FIG. 8 is a diagram illustrating an example process 800 performed, for example, by a mobile station, in accordance with the present disclosure. Example process 800 is an example where the mobile station (e.g., UE 120 and/or apparatus 1200 of FIG. 12) performs operations associated with configuring super slots for uplink and downlink.

As shown in FIG. 8, in some aspects, process 800 may include receiving, from a base station (e.g., base station 110 and/or apparatus 1300 of FIG. 13), an indication of a time domain resource allocation (block 810). For example, the mobile station (e.g., using reception component 1202, depicted in FIG. 12) may receive, from a base station, an indication of a time domain resource allocation, as described herein. In some aspects, the indication is associated with a starting symbol and a length and includes symbols across at least two slots.

As further shown in FIG. 8, in some aspects, process 800 may include communicating, with the base station, using the time domain resource allocation (block 820). For example, the mobile station (e.g., using reception component 1202 and/or transmission component 1204, depicted in FIG. 12) may communicate, with the base station, using the time domain resource allocation, as described herein.

Process 800 may include additional aspects, such as any single aspect or any combination of aspects described below and/or in connection with one or more other processes described elsewhere herein.

In a first aspect, the indication includes an RRC message.

In a second aspect, alone or in combination with the first aspect, the indication includes DCI.

In a third aspect, alone or in combination with one or more of the first and second aspects, the indication includes an index based at least in part on the starting symbol and the length.

In a fourth aspect, alone or in combination with one or more of the first through third aspects, the indication includes the starting symbol and the length.

In a fifth aspect, alone or in combination with one or more of the first through fourth aspects, communicating with the base station comprises receiving (e.g., using reception component 1202) data from the base station.

In a sixth aspect, alone or in combination with one or more of the first through fifth aspects, the indication is associated with dynamic scheduling.

In a seventh aspect, alone or in combination with one or more of the first through sixth aspects, the indication is associated with an SPS configuration.

In an eighth aspect, alone or in combination with one or more of the first through seventh aspects, communicating with the base station comprises transmitting (e.g., using transmission component 1204) data to the base station.

In a ninth aspect, alone or in combination with one or more of the first through eighth aspects, the indication is associated with dynamic scheduling.

In a tenth aspect, alone or in combination with one or more of the first through ninth aspects, the indication is associated with a configured grant scheduling scheme.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
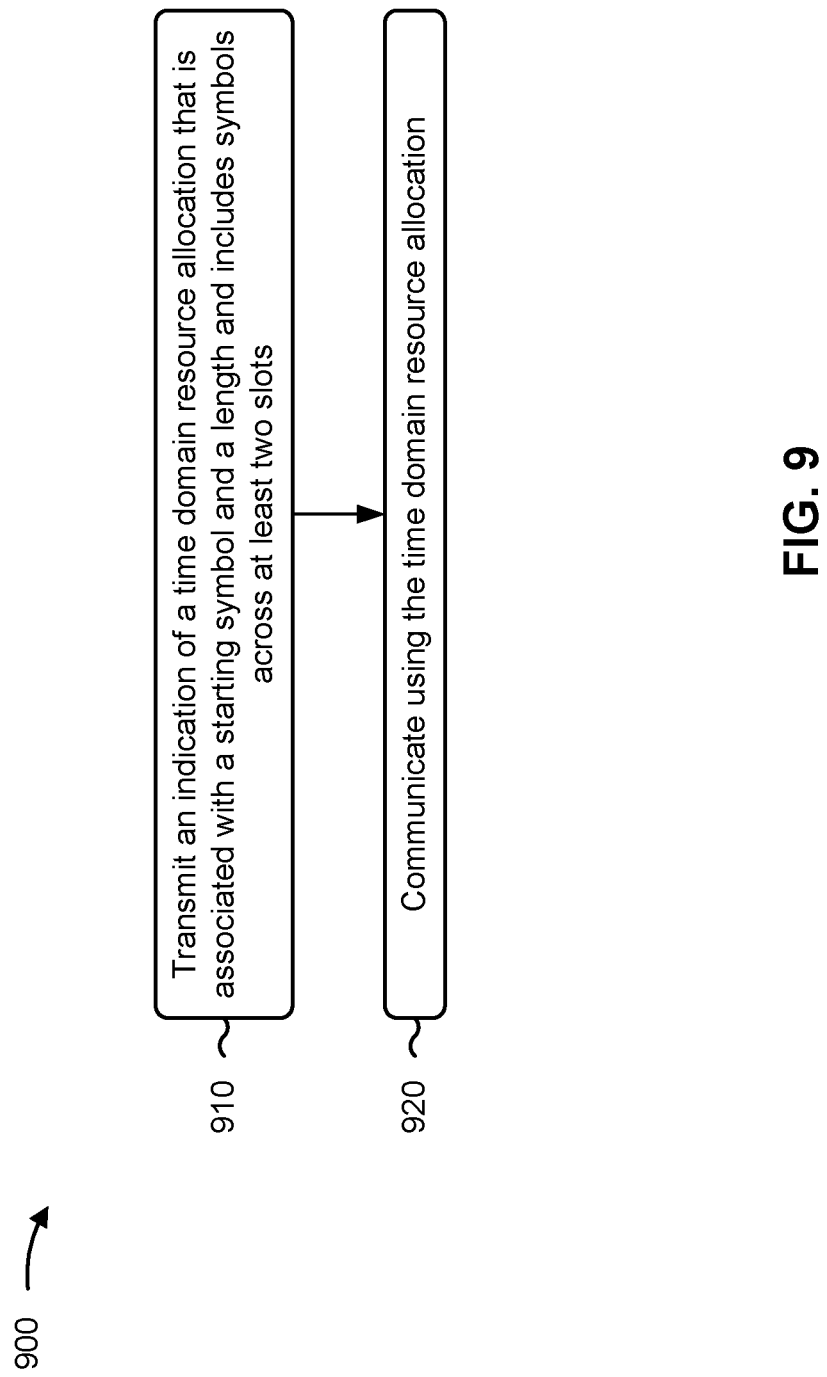

FIG. 9 is a diagram illustrating an example process 900 performed, for example, by a base station, in accordance with the present disclosure. Example process 900 is an example where the base station (e.g., base station 110 and/or apparatus 1300 of FIG. 13) performs operations associated with configuring super slots for uplink and downlink.

As shown in FIG. 9, in some aspects, process 900 may include transmitting, to a mobile station (e.g., UE 120 and/or apparatus 1200 of FIG. 12), an indication of a time domain resource allocation (block 910). For example, the base station (e.g., using transmission component 1304, depicted in FIG. 13) may transmit, to a mobile station, an indication of a time domain resource allocation, as described herein. In some aspects, the indication is associated with a starting symbol and a length and includes symbols across at least two slots.

As further shown in FIG. 9, in some aspects, process 900 may include communicating, with the mobile station, using the time domain resource allocation (block 920). For example, the base station (e.g., using transmission component 1304 and/or reception component 1302, depicted in FIG. 13) may communicate, with the mobile station, using the time domain resource allocation, as described herein.

Process 900 may include additional aspects, such as any single aspect or any combination of aspects described below and/or in connection with one or more other processes described elsewhere herein.

In a first aspect, the indication includes an RRC message.

In a second aspect, alone or in combination with the first aspect, the indication includes DCI.

In a third aspect, alone or in combination with one or more of the first and second aspects, the indication includes an index based at least in part on the starting symbol and the length.

In a fourth aspect, alone or in combination with one or more of the first through third aspects, the indication includes the starting symbol and the length.

In a fifth aspect, alone or in combination with one or more of the first through fourth aspects, communicating with the mobile station comprises transmitting (e.g., using transmission component 1304) data to the mobile station.

In a sixth aspect, alone or in combination with one or more of the first through fifth aspects, the indication is associated with dynamic scheduling.

In a seventh aspect, alone or in combination with one or more of the first through sixth aspects, the indication is associated with an SPS configuration.

In an eighth aspect, alone or in combination with one or more of the first through seventh aspects, communicating with the mobile station comprises receiving (e.g., using reception component 1302) data from the mobile station.

In a ninth aspect, alone or in combination with one or more of the first through eighth aspects, the indication is associated with dynamic scheduling.

In a tenth aspect, alone or in combination with one or more of the first through ninth aspects, the indication is associated with a configured grant scheduling scheme.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
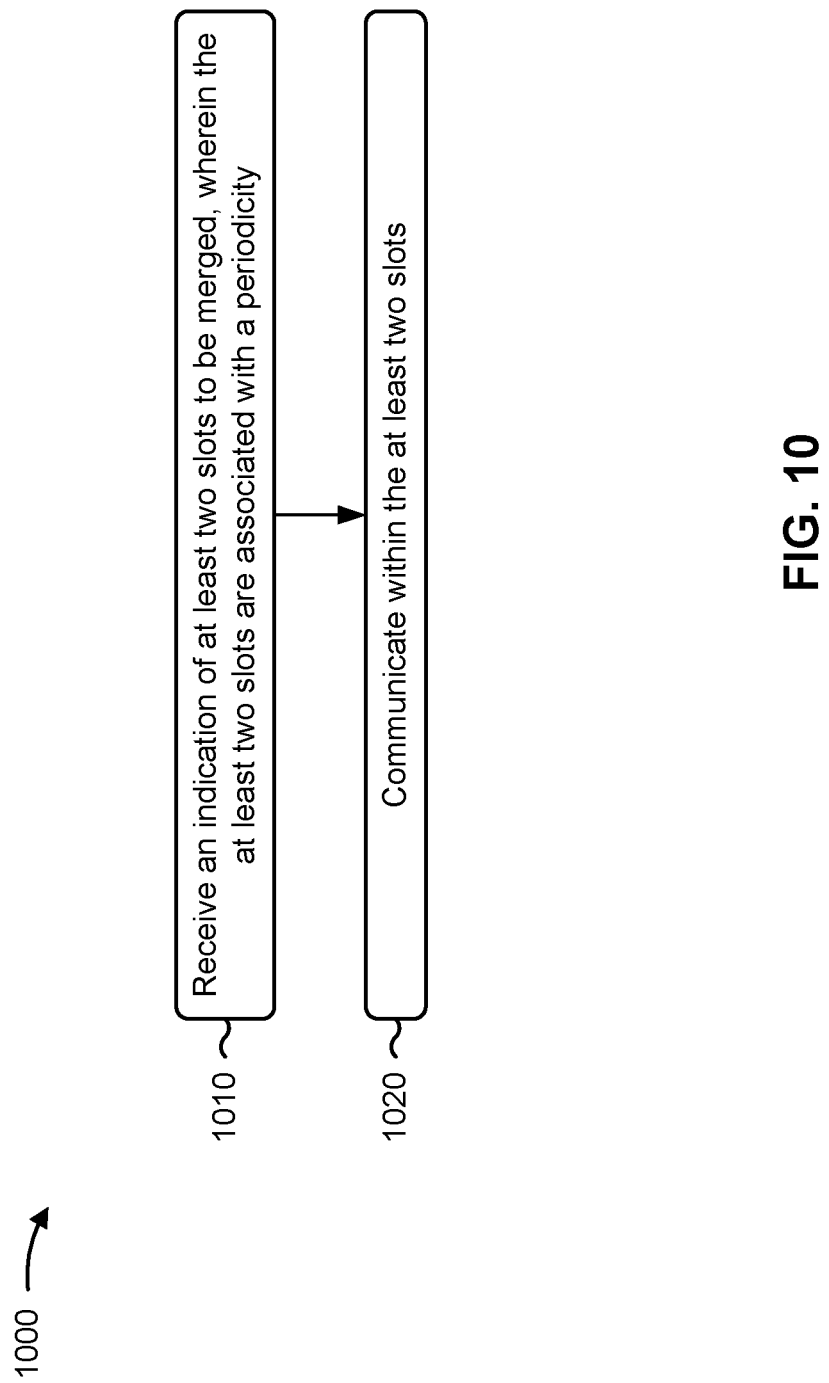

FIG. 10 is a diagram illustrating an example process 1000 performed, for example, by a mobile station, in accordance with the present disclosure. Example process 1000 is an example where the mobile station (e.g., UE 120 and/or apparatus 1200 of FIG. 12) performs operations associated with configuring super slots for uplink and downlink.

As shown in FIG. 10, in some aspects, process 1000 may include receiving, from a base station (e.g., base station 110 and/or apparatus 1300 of FIG. 13), an indication of at least two slots to be merged (block 1010). For example, the mobile station (e.g., using reception component 1202, depicted in FIG. 12) may receive, from a base station, an indication of at least two slots to be merged, as described herein. In some aspects, the at least two slots are associated with a periodicity.

As further shown in FIG. 10, in some aspects, process 1000 may include communicating, with the base station and within the at least two slots (block 1020). For example, the mobile station (e.g., using reception component 1202 and/or transmission component 1204, depicted in FIG. 12) may communicate, with the base station and within the at least two slots, as described herein.

Process 1000 may include additional aspects, such as any single aspect or any combination of aspects described below and/or in connection with one or more other processes described elsewhere herein.

In a first aspect, process 1000 further includes receiving (e.g., using reception component 1202), from the base station, an indication of a plurality of slots and the periodicity, where the at least two slots are included in the plurality of slots.

In a second aspect, alone or in combination with the first aspect, the indication of the plurality of slots includes at least one RRC message.

In a third aspect, alone or in combination with one or more of the first and second aspects, the at least two slots include at least one uplink slot.

In a fourth aspect, alone or in combination with one or more of the first through third aspects, the at least two slots include at least one downlink slot.

In a fifth aspect, alone or in combination with one or more of the first through fourth aspects, the at least two slots include at least one flexible slot.

In a sixth aspect, alone or in combination with one or more of the first through fifth aspects, the indication is based at least in part on a starting symbol and a length.

In a seventh aspect, alone or in combination with one or more of the first through sixth aspects, the indication includes a bitmap based at least in part on the periodicity.

In an eighth aspect, alone or in combination with one or more of the first through seventh aspects, the at least two slots are identified by an index associated with a first slot of the at least two slots.

In a ninth aspect, alone or in combination with one or more of the first through eighth aspects, process 1000 further includes receiving (e.g., using reception component 1202), from the base station, an indication of a change to the at least two slots.

In a tenth aspect, alone or in combination with one or more of the first through ninth aspects, the indication of the change includes DCI.

In an eleventh aspect, alone or in combination with one or more of the first through tenth aspects, the indication of the change includes an RRC message.

In a twelfth aspect, alone or in combination with one or more of the first through eleventh aspects, communicating with the base station comprises transmitting (e.g., using transmission component 1204) data to the base station.

In a thirteenth aspect, alone or in combination with one or more of the first through twelfth aspects, communicating with the base station comprises receiving (e.g., using reception component 1202) data from the base station.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
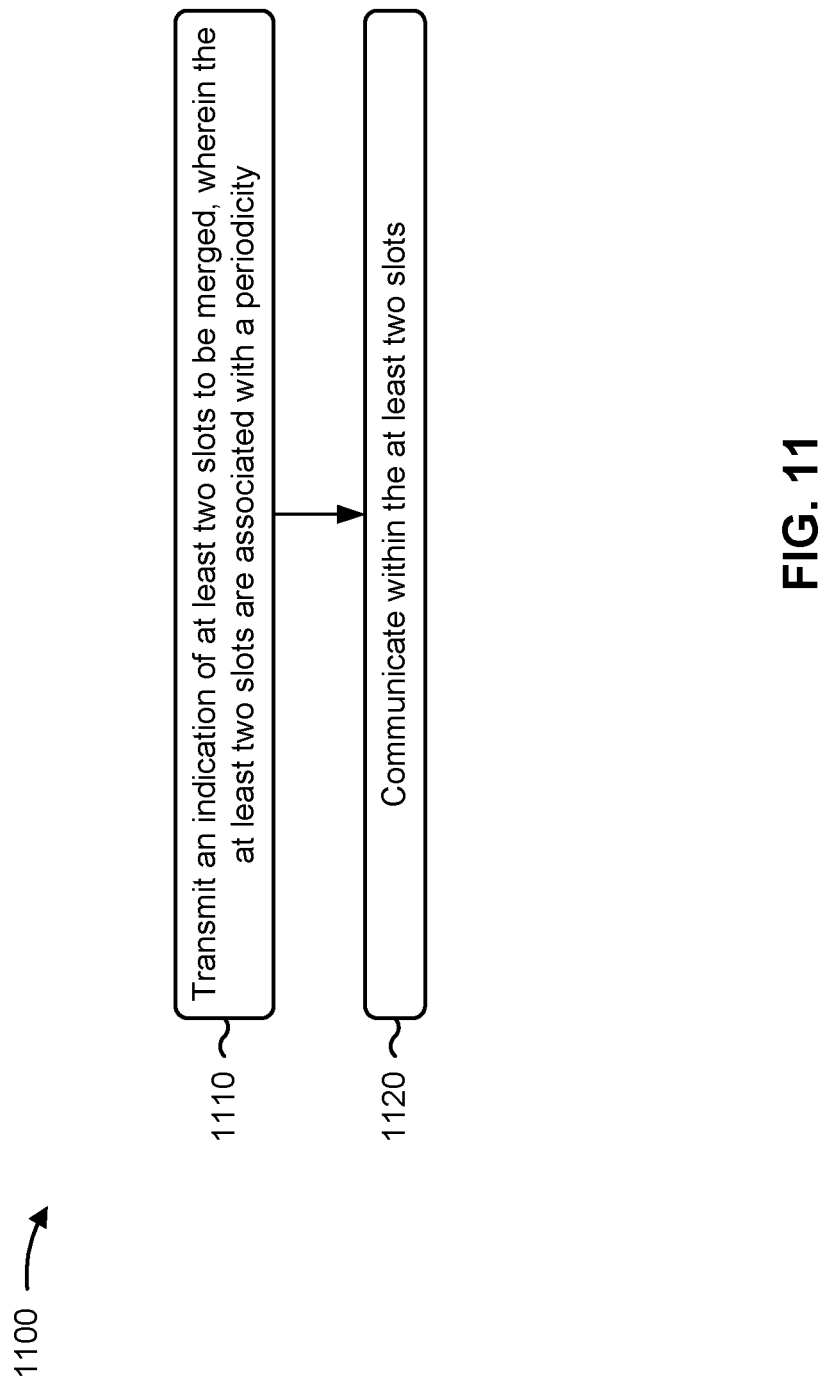

FIG. 11 is a diagram illustrating an example process 1100 performed, for example, by a base station, in accordance with the present disclosure. Example process 1100 is an example where the base station (e.g., base station 110 and/or apparatus 1300 of FIG. 13) performs operations associated with configuring super slots for uplink and downlink.

As shown in FIG. 11, in some aspects, process 1100 may include transmitting, to a mobile station (e.g., UE 120 and/or apparatus 1200 of FIG. 12), an indication of at least two slots to be merged (block 1110). For example, the base station (e.g., using transmission component 1304, depicted in FIG. 13) may transmit, to the mobile station, an indication of at least two slots to be merged, as described herein. In some aspects, the at least two slots are associated with a periodicity.

As further shown in FIG. 11, in some aspects, process 1100 may include communicating, with the mobile station and within the at least two slots (block 1120). For example, the base station (e.g., using transmission component 1304 and/or reception component 1302, depicted in FIG. 13) may communicate, with the mobile station and within the at least two slots, as described herein.

Process 1100 may include additional aspects, such as any single aspect or any combination of aspects described below and/or in connection with one or more other processes described elsewhere herein.

In a first aspect, process 1100 further includes transmitting (e.g., using transmission component 1304), to the mobile station, an indication of a plurality of slots and the periodicity, where the at least two slots are included in the plurality of slots.

In a second aspect, alone or in combination with the first aspect, the indication of the plurality of slots includes at least one RRC message.

In a third aspect, alone or in combination with one or more of the first and second aspects, the at least two slots include at least one uplink slot.

In a fourth aspect, alone or in combination with one or more of the first through third aspects, the at least two slots include at least one downlink slot.

In a fifth aspect, alone or in combination with one or more of the first through fourth aspects, the at least two slots include at least one flexible slot.

In a sixth aspect, alone or in combination with one or more of the first through fifth aspects, the indication is based at least in part on a starting symbol and a length.

In a seventh aspect, alone or in combination with one or more of the first through sixth aspects, the indication includes a bitmap based at least in part on the periodicity.

In an eighth aspect, alone or in combination with one or more of the first through seventh aspects, the at least two slots are identified by an index associated with a first slot of the at least two slots.

In a ninth aspect, alone or in combination with one or more of the first through eighth aspects, process 1100 further includes transmitting (e.g., using transmission component 1304), to the mobile station, an indication of a change to the at least two slots.

In a tenth aspect, alone or in combination with one or more of the first through ninth aspects, the indication of the change includes DCI.

In an eleventh aspect, alone or in combination with one or more of the first through tenth aspects, the indication of the change includes an RRC message.

In a twelfth aspect, alone or in combination with one or more of the first through eleventh aspects, communicating with the mobile station comprises transmitting (e.g., using transmission component 1304) data to the mobile station.

In a thirteenth aspect, alone or in combination with one or more of the first through twelfth aspects, communicating with the mobile station comprises receiving (e.g., using reception component 1302) data from the mobile station.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
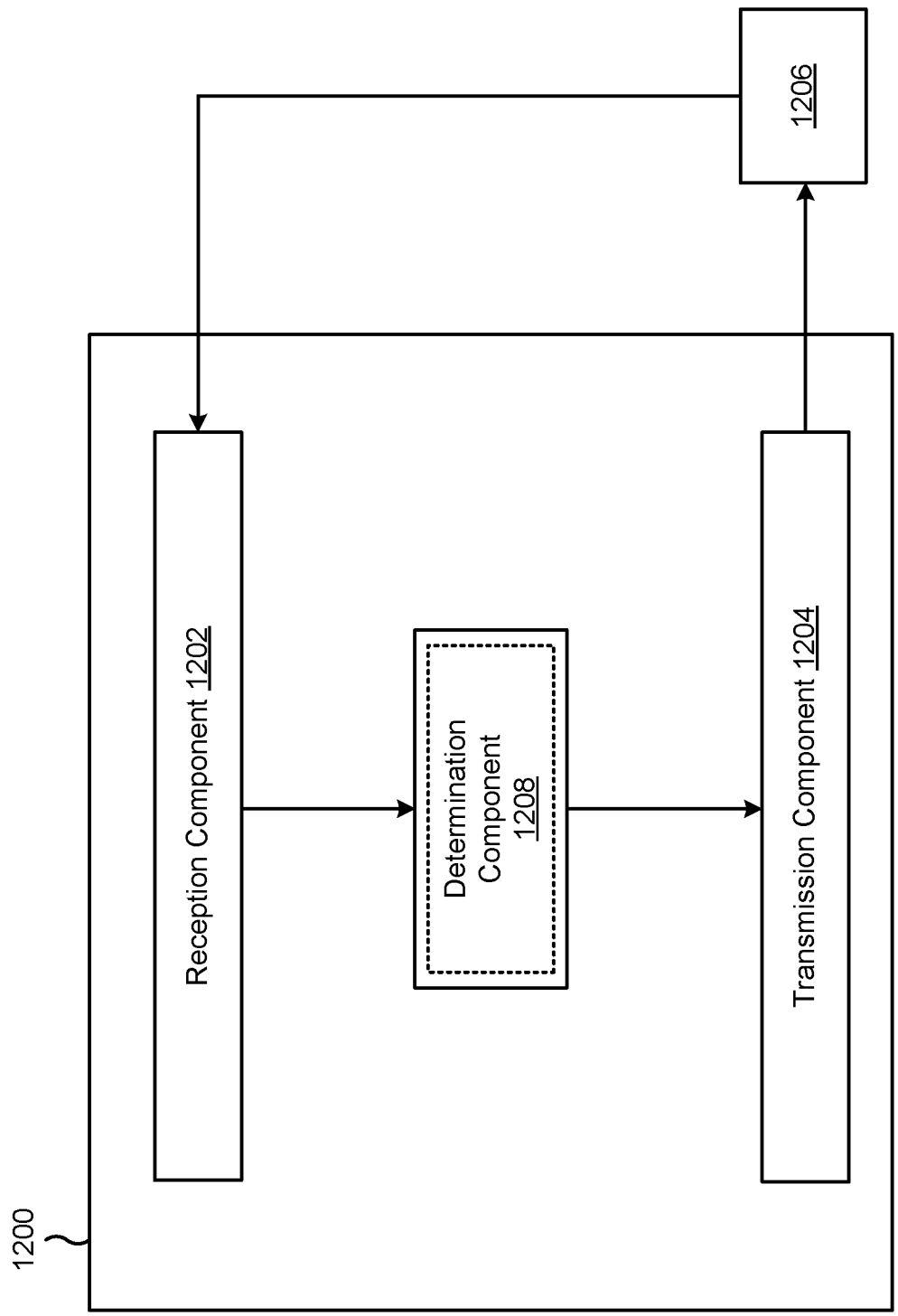
FIGS. 12 and 13 are diagrams of example apparatuses for wireless communication, in accordance with the present disclosure.

FIG. 12 is a block diagram of an example apparatus 1200 for wireless communication. The apparatus 1200 may be a mobile station, or a mobile station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIGS. 4-7. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

In some aspects, the reception component 1202 may receive, from the apparatus 1206, an indication of a time domain resource allocation. The indication may be associated with a starting symbol and a length and include symbols across at least two slots. For example, the determination component 1208 may determine the symbols across at least two slots based at least in part on the indication. The determination component 1208 may include a receive processor, a transmit processor, a controller/processor, a memory, or a combination thereof, of the UE described above in connection with FIG. 2. Accordingly, the reception component 1202 and/or the transmission component 1204 may communicate, with the apparatus 1206, using the time domain resource allocation.

Additionally, or alternatively, the reception component 1202 may receive, from the apparatus 1206, an indication of at least two slots to be merged, where the at least two slots are associated with a periodicity. For example, the determination component 1208 may determine the at least two slots based at least in part on the indication. Accordingly, the reception component 1202 and/or the transmission component 1204 may communicate, with the apparatus 1206 and within the at least two slots. In some aspects, the reception component 1202 may receive, from the apparatus 1206, an indication of a plurality of slots and the periodicity, where the at least two slots are included in the plurality of slots. Additionally, or alternatively, the reception component 1202 may receive, from the apparatus 1206, an indication of a change to the at least two slots. Accordingly, the reception component 1202 and/or the transmission component 1204 may communicate, with the apparatus 1206, based at least in part on the indication of the change.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
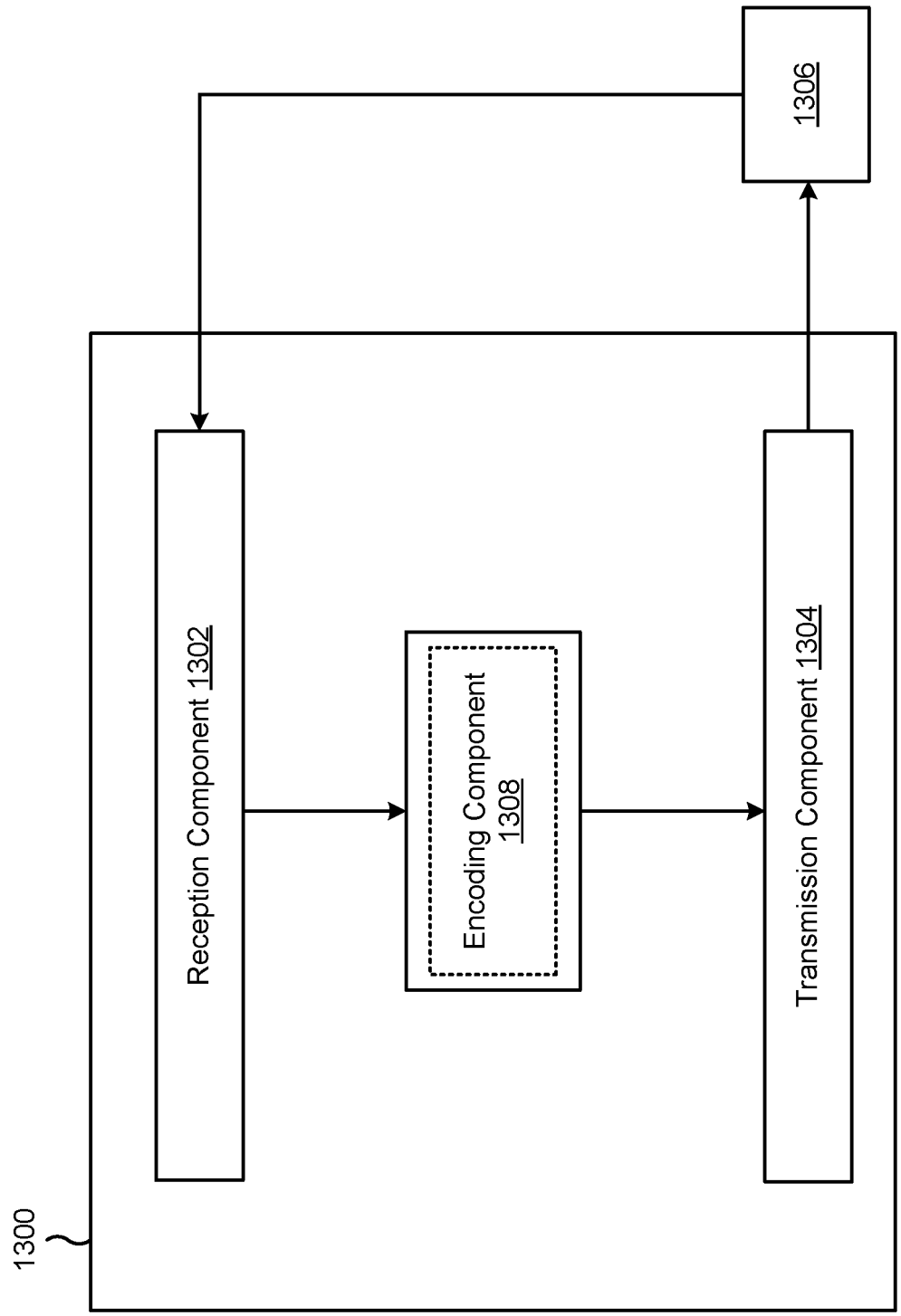

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include an encoding component 1308, among other examples.

In some aspects, the apparatus 1300 may be configured to perform one or more operations described herein in connection with FIGS. 4-7. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

In some aspects, the transmission component 1304 may transmit, to the apparatus 1306, an indication of a time domain resource allocation. The indication may be associated with a starting symbol and a length and include symbols across at least two slots. For example, the encoding component 1308 may encode the indication based at least in part on the starting symbol and the length. The encoding component 1308 may include a receive processor, a transmit processor, a controller/processor, a memory, or a combination thereof, of the base station described above in connection with FIG. 2. Accordingly, the reception component 1302 and/or the transmission component 1304 may communicate, with the apparatus 1306, using the time domain resource allocation.

Additionally, or alternatively, the transmission component 1304 may transmit, to the apparatus 1306, an indication of at least two slots to be merged, where the at least two slots are associated with a periodicity. For example, the encoding component 1308 may encode the indication based at least in part on the at least two symbols. Accordingly, the reception component 1302 and/or the transmission component 1304 may communicate, with the apparatus 1306 and within the at least two slots. In some aspects, the transmission component 1304 may transmit, to the apparatus 1306, an indication of a plurality of slots and the periodicity, where the at least two slots are included in the plurality of slots. Additionally, or alternatively, the transmission component 1304 may transmit, to the apparatus 1306, an indication of a change to the at least two slots. Accordingly, the reception component 1302 and/or the transmission component 1304 may communicate, with the apparatus 1306, based at least in part on the indication of the change.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication, comprising: receiving, at a mobile station and from a base station, an indication of a time domain resource allocation, wherein the indication is associated with a starting symbol and a length and comprises symbols across at least two slots; and communicating, with the base station, using the time domain resource allocation.

Aspect 2: The method of Aspect 1, wherein the indication comprises a radio resource control (RRC) message.

Aspect 3: The method of Aspect 1, wherein the indication comprises downlink control information (DCI).

Aspect 4: The method of any of Aspects 1 through 3, wherein the indication comprises an index based at least in part on the starting symbol and the length.

Aspect 5: The method of any of Aspects 1 through 3, wherein the indication comprises the starting symbol and the length.

Aspect 6: The method of any of Aspects 1 through 5, wherein communicating with the base station comprises receiving data from the base station.

Aspect 7: The method of Aspect 6, wherein the indication is associated with dynamic scheduling.

Aspect 8: The method of Aspect 6, wherein the indication is associated with a semi-persistent scheduling (SPS) configuration.

Aspect 9: The method of any of Aspects 1 through 5, wherein communicating with the base station comprises transmitting data to the base station.

Aspect 10: The method of Aspect 9, wherein the indication is associated with dynamic scheduling.

Aspect 11: The method of Aspect 9, wherein the indication is associated with a configured grant scheduling scheme.

Aspect 12: A method of wireless communication, comprising: transmitting, at a base station and to a mobile station, an indication of a time domain resource allocation, wherein the indication is associated with a starting symbol and a length and comprises symbols across at least two slots; and communicating, with the mobile station, using the time domain resource allocation.

Aspect 13: The method of Aspect 12, wherein the indication comprises a radio resource control (RRC) message.

Aspect 14: The method of Aspect 12, wherein the indication comprises downlink control information (DCI).

Aspect 15: The method of any of Aspects 12 through 14, wherein the indication comprises an index based at least in part on the starting symbol and the length.

Aspect 16: The method of any of Aspects 12 through 14, wherein the indication comprises the starting symbol and the length.

Aspect 17: The method of any of Aspects 12 through 16, wherein communicating with the mobile station comprises transmitting data to the mobile station.

Aspect 18: The method of Aspect 17, wherein the indication is associated with dynamic scheduling.

Aspect 19: The method of Aspect 17, wherein the indication is associated with a semi-persistent scheduling (SPS) configuration.

Aspect 20: The method of any of Aspects 12 through 16, wherein communicating with the mobile station comprises receiving data from the mobile station.

Aspect 21: The method of Aspect 20, wherein the indication is associated with dynamic scheduling.

Aspect 22: The method of Aspect 20, wherein the indication is associated with a configured grant scheduling scheme.

Aspect 23: A method of wireless communication, comprising: receiving, at a mobile station and from a base station, an indication of at least two slots to be merged, wherein the at least two slots are associated with a periodicity; and communicating, with the base station and within the at least two slots.

Aspect 24: The method of Aspect 23, further comprising: receiving, from the base station, an indication of a plurality of slots and the periodicity, wherein the plurality of slots include the at least two slots.

Aspect 25: The method of Aspect 24, wherein the indication of the plurality of slots comprises at least one radio resource control (RRC) message.

Aspect 26: The method of any of Aspects 23 through 25, wherein the at least two slots comprise at least one uplink slot.

Aspect 27: The method of any of Aspects 23 through 26, wherein the at least two slots comprise at least one downlink slot.

Aspect 28: The method of any of Aspects 23 through 27, wherein the at least two slots comprise at least one flexible slot.

Aspect 29: The method of any of Aspects 23 through 28, wherein the indication is based at least in part on a starting symbol and a length.

Aspect 30: The method of any of Aspects 23 through 28, wherein the indication comprises a bitmap based at least in part on the periodicity.

Aspect 31: The method of any of Aspects 23 through 30, wherein the at least two slots are identified by an index associated with a first slot of the at least two slots.

Aspect 32: The method of any of Aspects 23 through 31, further comprising: receiving, from the base station, an indication of a change to the at least two slots.

Aspect 33: The method of Aspect 32, wherein the indication of the change comprises downlink control information (DCI).

Aspect 34: The method of Aspect 32, wherein the indication of the change comprises a radio resource control (RRC) message.

Aspect 35: The method of any of Aspects 23 through 34, wherein communicating with the base station comprises transmitting data to the base station.

Aspect 36: The method of any of Aspects 23 through 34, wherein communicating with the base station comprises receiving data from the base station.

Aspect 37: A method of wireless communication, comprising: transmitting, at a base station and to a mobile station, an indication of at least two slots to be merged, wherein the at least two slots are associated with a periodicity; and communicating, with the mobile station and within the at least two slots.

Aspect 38: The method of Aspect 37, further comprising: transmitting, to the mobile station, an indication of a plurality of slots and the periodicity, wherein the plurality of slots include the at least two slots.

Aspect 39: The method of Aspect 38, wherein the indication of the plurality of slots comprises at least one radio resource control (RRC) message.

Aspect 40: The method of any of Aspects 37 through 39, wherein the at least two slots comprise at least one uplink slot.

Aspect 41: The method of any of Aspects 37 through 40, wherein the at least two slots comprise at least one downlink slot.

Aspect 42: The method of any of Aspects 37 through 41, wherein the at least two slots comprise at least one flexible slot.

Aspect 43: The method of any of Aspects 37 through 42, wherein the indication is based at least in part on a starting symbol and a length.

Aspect 44: The method of any of Aspects 37 through 42, wherein the indication comprises a bitmap based at least in part on the periodicity.

Aspect 45: The method of any of Aspects 37 through 44, wherein the at least two slots are identified by an index associated with a first slot of the at least two slots.

Aspect 46: The method of any of Aspects 37 through 45, further comprising: transmitting, to the mobile station, an indication of a change to the at least two slots.

Aspect 47: The method of Aspect 46, wherein the indication of the change comprises downlink control information (DCI).

Aspect 48: The method of Aspect 46, wherein the indication of the change comprises a radio resource control (RRC) message.

Aspect 49: The method of any of Aspects 37 through 48, wherein communicating with the mobile station comprises transmitting data to the mobile station.

Aspect 50: The method of any of Aspects 37 through 48, wherein communicating with the mobile station comprises receiving data from the mobile station.

Aspect 51: An apparatus for wireless communication at a device, comprising a processor; memory coupled with the processor; and instructions stored in the memory and executable by the processor to cause the apparatus to perform the method of one or more of Aspects 1-11.

Aspect 52: A device for wireless communication, comprising a memory and one or more processors coupled to the memory, the one or more processors configured to perform the method of one or more of Aspects 1-11.

Aspect 53: An apparatus for wireless communication, comprising at least one means for performing the method of one or more of Aspects 1-11.

Aspect 54: A non-transitory computer-readable medium storing code for wireless communication, the code comprising instructions executable by a processor to perform the method of one or more of Aspects 1-11.

Aspect 55: A non-transitory computer-readable medium storing a set of instructions for wireless communication, the set of instructions comprising one or more instructions that, when executed by one or more processors of a device, cause the device to perform the method of one or more of Aspects 1-11.

Aspect 56: An apparatus for wireless communication at a device, comprising a processor; memory coupled with the processor; and instructions stored in the memory and executable by the processor to cause the apparatus to perform the method of one or more of Aspects 12-22.

Aspect 57: A device for wireless communication, comprising a memory and one or more processors coupled to the memory, the one or more processors configured to perform the method of one or more of Aspects 12-22.

Aspect 58: An apparatus for wireless communication, comprising at least one means for performing the method of one or more of Aspects 12-22.

Aspect 59: A non-transitory computer-readable medium storing code for wireless communication, the code comprising instructions executable by a processor to perform the method of one or more of Aspects 12-22.

Aspect 60: A non-transitory computer-readable medium storing a set of instructions for wireless communication, the set of instructions comprising one or more instructions that, when executed by one or more processors of a device, cause the device to perform the method of one or more of Aspects 12-22.

Aspect 61: An apparatus for wireless communication at a device, comprising a processor; memory coupled with the processor; and instructions stored in the memory and executable by the processor to cause the apparatus to perform the method of one or more of Aspects 23-36.

Aspect 62: A device for wireless communication, comprising a memory and one or more processors coupled to the memory, the one or more processors configured to perform the method of one or more of Aspects 23-36.

Aspect 63: An apparatus for wireless communication, comprising at least one means for performing the method of one or more of Aspects 23-36.

Aspect 64: A non-transitory computer-readable medium storing code for wireless communication, the code comprising instructions executable by a processor to perform the method of one or more of Aspects 23-36.

Aspect 65: A non-transitory computer-readable medium storing a set of instructions for wireless communication, the set of instructions comprising one or more instructions that, when executed by one or more processors of a device, cause the device to perform the method of one or more of Aspects 23-36.

Aspect 66: An apparatus for wireless communication at a device, comprising a processor; memory coupled with the processor; and instructions stored in the memory and executable by the processor to cause the apparatus to perform the method of one or more of Aspects 37-50.

Aspect 67: A device for wireless communication, comprising a memory and one or more processors coupled to the memory, the one or more processors configured to perform the method of one or more of Aspects 37-50.

Aspect 68: An apparatus for wireless communication, comprising at least one means for performing the method of one or more of Aspects 37-50.

Aspect 69: A non-transitory computer-readable medium storing code for wireless communication, the code comprising instructions executable by a processor to perform the method of one or more of Aspects 37-50.

Aspect 70: A non-transitory computer-readable medium storing a set of instructions for wireless communication, the set of instructions comprising one or more instructions that, when executed by one or more processors of a device, cause the device to perform the method of one or more of Aspects 37-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a mobile station, comprising:
   one or more memories; and
   one or more processors, based at least in part on information stored in the one or more memories, configured to:
     receive, from a network entity, an indication of at least two adjacent slots within a subframe to be merged to form a super slot, wherein the at least two adjacent slots are associated with a periodicity, the indication including a bitmap based at least in part on the periodicity, and wherein the super slot repeats in time based at least in part on the periodicity; and
     communicate, with the network entity, within the super slot formed by the at least two adjacent slots.

2. The apparatus of claim 1, wherein the one or more processors are further configured to:
   receive, from the network entity, an indication of a plurality of slots and the periodicity, wherein the plurality of slots include the at least two adjacent slots.

3. The apparatus of claim 2, wherein the indication of the plurality of slots comprises at least one radio resource control (RRC) message.

4. The apparatus of claim 1, wherein the at least two adjacent slots comprise at least one uplink slot.

5. The apparatus of claim 1, wherein the at least two adjacent slots comprise at least one downlink slot.

6. The apparatus of claim 1, wherein the at least two adjacent slots comprise at least one flexible slot.

7. The apparatus of claim 1, wherein the one or more processors are further configured to:
   receive, from the network entity, an indication of a change to the at least two adjacent slots.

8. The apparatus of claim 7, wherein the indication of the change comprises a radio resource control (RRC) message or downlink control information (DCI).

9. The apparatus of claim 1, wherein communicating with the network entity comprises transmitting data to the network entity or receiving data from the network entity.

10. An apparatus for wireless communication at a network entity, comprising:
    one or more memories; and
    one or more processors, based at least in part on information stored in the one or more memories, configured to:
      transmit, to a mobile station, an indication of at least two adjacent slots within a subframe to be merged to form a super slot, wherein the at least two adjacent slots are associated with a periodicity, the indication including a bitmap based at least in part on the periodicity, and wherein the super slot repeats in time based at least in part on the periodicity; and
      communicate, with the mobile station, within the super slot formed by the at least two adjacent slots.

11. The apparatus of claim 10, wherein the one or more processors are further configured to:
    transmit, to the mobile station, an indication of a plurality of slots and the periodicity, wherein the plurality of slots include the at least two adjacent slots.

12. The apparatus of claim 11, wherein the indication of the plurality of slots comprises at least one radio resource control (RRC) message.

13. The apparatus of claim 10, wherein the at least two adjacent slots comprise at least one uplink slot.

14. The apparatus of claim 10, wherein the at least two adjacent slots comprise at least one downlink slot.

15. The apparatus of claim 10, wherein the at least two adjacent slots comprise at least one flexible slot.

16. The apparatus of claim 10, wherein the one or more processors are further configured to:
    transmit, to the mobile station, an indication of a change to the at least two adjacent slots.

17. The apparatus of claim 16, wherein the indication of the change comprises a radio resource control (RRC) message or downlink control information (DCI).

18. The apparatus of claim 10, wherein communicating with the mobile station comprises receiving data from the mobile station or transmitting data to the mobile station.

19. A method of wireless communication performed by a mobile station, comprising:
    receiving, from a network entity, an indication of at least two adjacent slots within a subframe to be merged to form a super slot, wherein the at least two adjacent slots are associated with a periodicity, the indication including a bitmap based at least in part on the periodicity, and wherein the super slot repeats in time based at least in part on the periodicity; and
    communicating, with the network entity, within the super slot formed by the at least two adjacent slots.

20. The method of claim 19, further comprising:
    receiving, from the network entity, an indication of a plurality of slots and the periodicity, wherein the plurality of slots include the at least two adjacent slots.

21. The method of claim 20, wherein the indication of the plurality of slots comprises at least one radio resource control (RRC) message.

22. The method of claim 19, wherein the at least two adjacent slots comprise at least one uplink slot.

23. The method of claim 19, wherein the at least two adjacent slots comprise at least one downlink slot.

24. The method of claim 19, wherein the at least two adjacent slots comprise at least one flexible slot.

25. The method of claim 19, further comprising:
  receiving, from the network entity, an indication of a change to the at least two adjacent slots.

26. The method of claim 25, wherein the indication of the change comprises a radio resource control (RRC) message or downlink control information (DCI).

27. The method of claim 19, wherein communicating with the network entity comprises transmitting data to the network entity or receiving data from the network entity.

28. A method of wireless communication performed by a network entity, comprising:
  transmitting, to a mobile station, an indication of at least two adjacent slots within a subframe to be merged to form a super slot, wherein the at least two adjacent slots are associated with a periodicity, the indication including a bitmap based at least in part on the periodicity, and wherein the super slot repeats in time based at least in part on the periodicity; and
  communicating, with the mobile station, within the super slot formed by the at least two adjacent slots.

29. The method of claim 28, further comprising:
  transmitting, to the mobile station, an indication of a plurality of slots and the periodicity, wherein the plurality of slots include the at least two adjacent slots.

30. The method of claim 28, wherein communicating with the mobile station comprises transmitting data to the mobile station or receiving data from the mobile station.

\* \* \* \* \*